United States Patent
Corrao et al.

(10) Patent No.: US 8,161,526 B2
(45) Date of Patent: Apr. 17, 2012

(54) PROTECTING SENSITIVE INFORMATION ON A PUBLICLY ACCESSED DATA PROCESSING SYSTEM

(75) Inventors: Ann Mead Corrao, Raleigh, NC (US); Brian Marshall O'Connell, Cary, NC (US); Brian James Snitzer, Lancaster, PA (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1212 days.

(21) Appl. No.: 11/876,248

(22) Filed: Oct. 22, 2007

(65) Prior Publication Data

US 2009/0106835 A1    Apr. 23, 2009

(51) Int. Cl.
  *G06F 7/04* (2006.01)
  *G06F 17/30* (2006.01)
(52) U.S. Cl. .............................................. 726/2; 726/26
(58) Field of Classification Search .......................... None
  See application file for complete search history.

(56) References Cited

U.S. PATENT DOCUMENTS

| | | | |
|---|---|---|---|
| 5,884,031 A * | 3/1999 | Ice | 709/203 |
| 6,081,899 A | 6/2000 | Byrd | |
| 6,799,198 B1 | 9/2004 | Huboi et al. | |
| 7,047,369 B1 * | 5/2006 | Gruper et al. | 711/152 |
| 7,685,254 B2 * | 3/2010 | Pandya | 709/217 |
| 7,810,149 B2 * | 10/2010 | Islam et al. | 726/11 |
| 2003/0074552 A1 | 4/2003 | Olkin et al. | |
| 2003/0097561 A1 | 5/2003 | Wheeler et al. | |
| 2004/0053619 A1 | 3/2004 | Kim et al. | |
| 2005/0166065 A1 | 7/2005 | Eytchison et al. | |
| 2007/0016954 A1 * | 1/2007 | Choi et al. | 726/25 |
| 2007/0214272 A1 | 9/2007 | Isaacson | |
| 2009/0077383 A1 | 3/2009 | de Monseignat et al. | |
| 2009/0106664 A1 | 4/2009 | Corrao et al. | |

OTHER PUBLICATIONS

USPTO Office Action for U.S. Appl. No. 11/876,275 dated Dec. 29, 2010.
USPTO Office Action for U.S. Appl. No. 11/876,275 dated May 26, 2011.

* cited by examiner

*Primary Examiner* — William Powers
(74) *Attorney, Agent, or Firm* — Yee & Associates, P.C.; Mark C. Vallone

(57) ABSTRACT

The illustrative embodiments described herein provide a computer implemented method, apparatus, and computer program product protecting sensitive information on a data processing system. A determination is made as to whether a data processing system is publicly accessed. Responsive to determining that a data processing system is publicly accessed, the system identifies sensitive information. The data processing system monitors for the presence of sensitive information. Responsive to detecting the presence of the sensitive information, the system presents a warning to a user of the data processing system.

17 Claims, 3 Drawing Sheets

PROTECTING SENSITIVE INFORMATION ON A PUBLICLY ACCESSED DATA PROCESSING SYSTEM

CROSS REFERENCE TO RELATED APPLICATION

The present invention is related to the following patent application: entitled "Public Status Determination and Security Configuration of a Browser", Ser. No. 11/876,275, filed even date hereof, assigned to the same assignee, and incorporated herein by reference.

BACKGROUND OF THE INVENTION

1. Field of the Invention

The present invention relates generally to an improved data processing system and method for protecting sensitive information. Still more particularly, the present invention relates to a computer implemented method, apparatus, and computer program product for protecting sensitive information on a publicly accessed data processing system.

2. Description of the Related Art

One model of web browsing, termed public web browsing, exists in which users are allowed to use computers that access the Internet via a web browser in a public setting. Such systems commonly exist in places, such as, libraries, coffee houses, internet cafes, and car dealerships. Users of public systems often perform common tasks such as general web surfing, updating blogs, composing email, ordering merchandise, and accessing on-line banking. Unfortunately, many users are unaware of the potential security risks that exist from exposing discoverable private data on a public computer system. For example, some websites may allow users to save private data to the system using known technologies such as cookies. The cookie data or other data stored within the web browser can potentially allow subsequent malicious users access to private information that may be used for fraudulent or criminal purposes. Similarly, many browsers allow data from forms, including passwords, to be stored, and in some cases without prompting the user.

Most browsers, by default, are optimized for private usage due to the increased usability provided, thus, most browsers are set to store private information. Current web browsing applications provide security settings to address the above problems, but they require the user to be familiar with the location of these settings within the application and understand each setting's effect. As a manual process, configuring the security settings is prone to errors and even omission of the entire process.

SUMMARY OF THE INVENTION

The illustrative embodiments described herein provide a computer implemented method, apparatus, and computer program product protecting sensitive information on a data processing system. A determination is made as to whether a data processing system is publicly accessed. Responsive to determining that a data processing system is publicly accessed, the system identifies sensitive information. The data processing system monitors for the presence of sensitive information. Responsive to detecting the presence of the sensitive information, the system presents a warning to a user of the data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
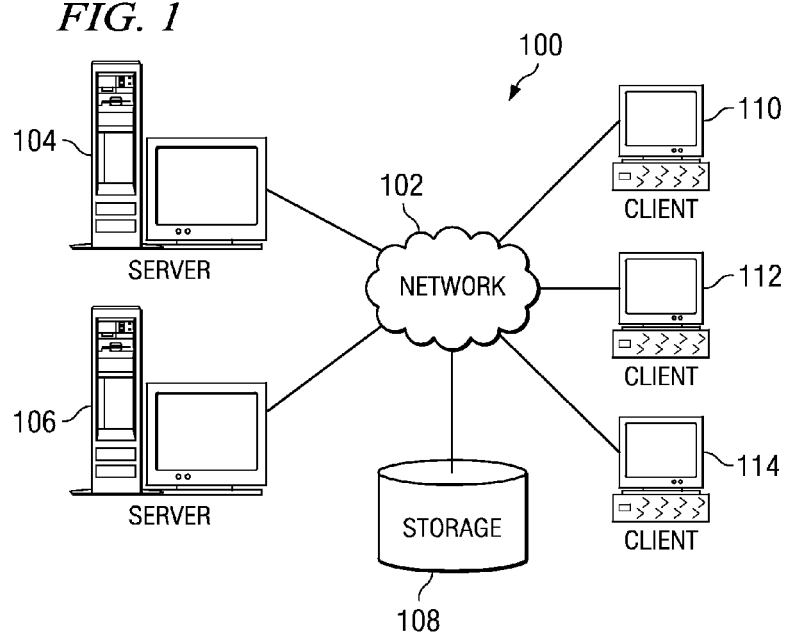
FIG. 1 is a pictorial representation of a network of data processing systems in which illustrative embodiments may be implemented.
Figure 2:
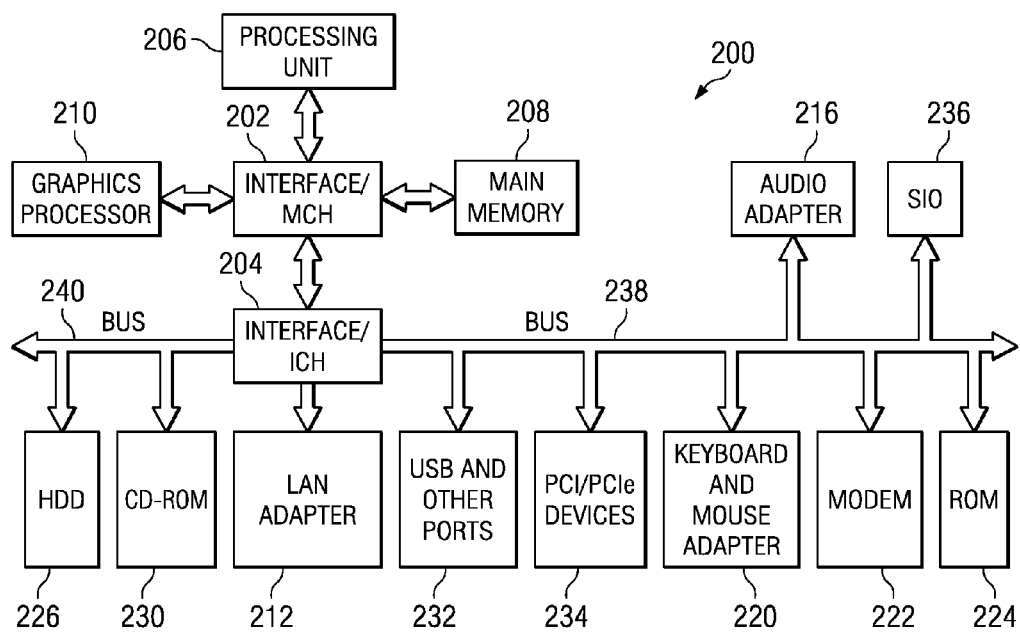
FIG. 2 is a block diagram of a data processing system in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. The illustrative embodiments may be implemented in a data processing system, such as clients 110, 112, and 114. Clients 110, 112, and 114 may use an Internet browser to communicate with server 104. Network data processing system 100 may include additional servers, clients, and other devices not shown.

Network 102 may be, without limitation, a local area network (LAN), wide area network (WAN), Internet, Ethernet, or Intranet. In this example, network 102 is the Internet, representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as directory server 104, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method for protecting sensitive information on a data processing system such as data processing system 200 depicted in FIG. 2. The data processing system may communicate to other data processing systems such as clients 110, 112, and 114 or servers 104, and 106 over a network such as network 102 as depicted in FIG. 1.

Figure 3:
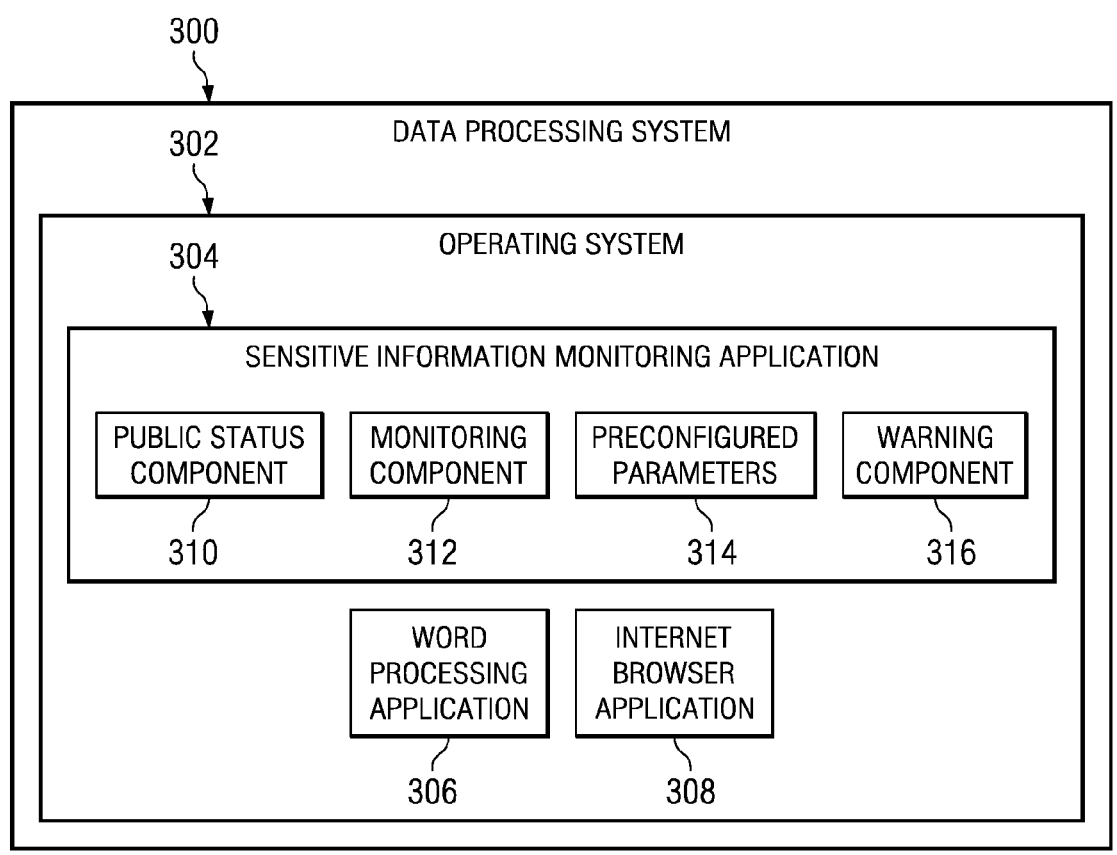
FIG. 3 is a block diagram depicting components of a data processing system in which illustrative embodiments may be implemented.

With reference now to FIG. 3, a block diagram depicting components of a data processing system in which illustrative embodiments may be implemented is presented. Data processing system 300 may be implemented in a data processing system, such as a client 110 shown in FIG. 1, or data processing system 200 shown in FIG. 2.

Operating system 302 runs on data processing system 300. Operating system 302 may be a commercially available operating system such as, but not limited to, Microsoft® Windows® XP. The illustrative embodiments may be implemented in a sensitive information monitoring application 304 running on operating system 302. Operating system 302 may run other software applications, such as, but not limited to, a word processing application 306 and an Internet browser application 308. Word processing application 306 may be any commercially available word processor, including but not limited to, Microsoft® Word, Corel® WordPerfect®, and Sun Microsystem® StarWriter. Internet browser application 308 may be any commercially available browser, including but not limited to, Microsoft® Internet Explorer®, Mozilla® Firefox®, and Apple® Safari®.

Sensitive information monitoring application 304 contains public status component 310, monitoring component 213, preconfigured parameters 314, and warning component 316. Public status component 310 performs the function of identifying whether data processing system 300 is publicly accessed. The method for determining whether data processing system 300 is publicly accessed may include, but is not limited to, a self determination process performed by data processing system 300 as described in a related application entitled "Public Status Determination and Security Configuration of a Browser", Ser. No. 11/876,275. This process will be further described in FIG. 5.

Monitoring component 312 monitors for the presence of sensitive information. Sensitive information is personal information that is normally kept private. For example, sensitive information may include, but is not limited to, phone numbers, addresses, credit card numbers, social security numbers, and driver license numbers. Sensitive information may be based on a set of preconfigured parameters, such as preconfigured parameters 314. Additionally, a user may define data or information that the user considers to be sensitive information, such as, but not limited to, information relating to a new invention. In addition, an administrator or other authority, such as a parent or employer, may define the data or information on behalf of the user or in accordance with the interests of the administrator. An administrator, as referenced herein, is a person who is responsible for managing and maintaining the data processing system. Upon detecting the presence of sensitive information, monitoring component 312 notifies warning component 316.

Warning component 316 presents a warning to the user indicating the presence of sensitive information has been detected. The warning may be in the form of an audible warning, such as, but not limited to, an audible beep to indicate the presence of sensitive information or an audible verbal warning. Additionally, the warning may be in the form of a pop-up screen indicating the presence of sensitive information has been detected. Additional details may be provided with the warning.

For example, the type of sensitive information that has been detected may be displayed, such as, but not limited to, "Social Security Number Detected". Further details associated with the specific sensitive information, such as, but not limited to, the application in which the sensitive information was detected may also be displayed. In one illustrative embodiment, the user may select an option to display the specific sensitive information that has been detected as part of the warning. In another illustrative embodiment, a user authorization may be required, after a general warning has been presented, to display the specific sensitive information that has been detected. The user may be required to respond to the warning to permit the data processing system to perform additional functions, as will be further described below in FIG. 4.

Figure 4:
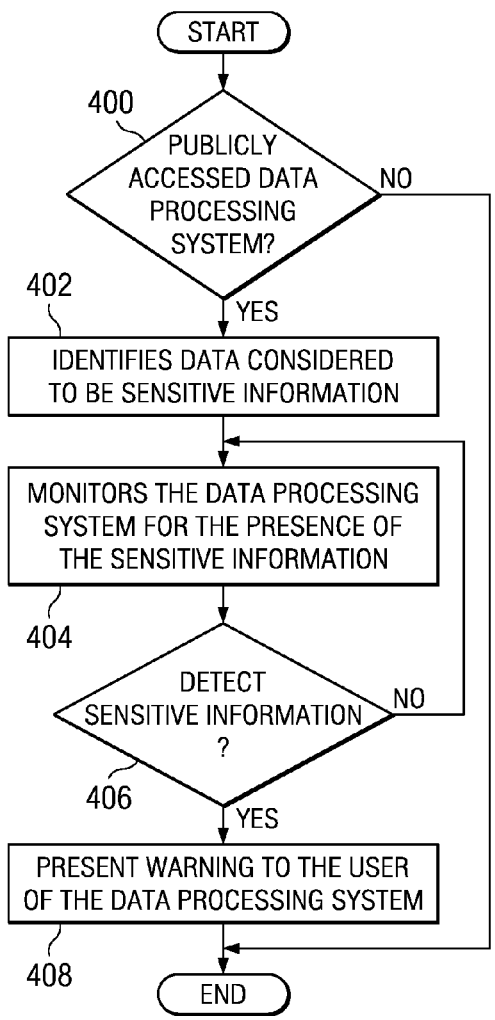
FIG. 4 is a flowchart illustrating a process for protecting sensitive information in accordance with an illustrative embodiment.

FIG. 4 is a flowchart illustrating a process for protecting sensitive information in accordance with an illustrative embodiment. The process of FIG. 4 may be implemented in a software application, such as sensitive information monitoring application 304 depicted in FIG. 3.

The process begins by determining whether a data processing system is a publicly accessed data processing system (step 400). As previously stated, the method of determining whether a data processing system is a publicly accessed data processing system may be a self determination process performed by the data processing system. Additionally, the data processing system may receive an indication from a user that the data processing system is a publicly accessed data processing system. The indication may be in the form of, but not limited to, the user indicating to a web service that the system is a publicly accessed data processing system.

For example, an email web service may have a check box on the log-in page of the email web service to indicate that the system is a publicly accessed data processing system. By checking this box, the web service may perform certain functions, such as, but not limited to, limiting the duration of cookies stored on the data processing system. Another indication that may be used to determine that the data processing system is a publicly accessed data processing system is the security and privacy configuration of the browser(s) running on the data processing system. For example, the security and privacy configuration may be configured not to store user passwords indicating that the data processing system is a publicly accessed data processing system.

Responsive to a determination that the data processing system is not a publicly accessed data processing system, the process ends. Otherwise, the process identifies data considered to be sensitive information (step 402). Sensitive information may be based on a set of preconfigured parameters, such as preconfigured parameters 314 depicted in FIG. 3. The preconfigured parameters may be configured to identify data which most people consider to be private. For example, the preconfigured parameters may identify the presence of social security numbers, credit card numbers, and birth dates. Additionally, a user or administrator may define data or information that may be considered as sensitive information, such as, but not limited to, information relating to a particular topic.

The process then monitors the data processing system for the presence of the sensitive information (step 404). As part of the monitoring process, all outbound data packets are examined to determine whether the data packets contain any sensitive information. Additionally, all inbound data packets may also be examined for any content containing sensitive information. Furthermore, the process may monitor all user inputs. For example, the process may monitor data that the user types into a word processing document to determine whether the word processing document contains any sensitive information.

The process then determines whether any sensitive information is detected in any user input, outgoing data packets, or incoming data packets (step 406). If the process does not detect sensitive information, then the process returns to monitoring step 404. If the process detects that sensitive information is present, the process presents a warning to the user of the data processing system (step 408), with the process terminating thereafter.

As previously described, the warning may be in the form of an audible warning or maybe in the form of a pop-up display. The user may have to acknowledge the warning. For example, if the process detects sensitive information in an outbound data packet, the process may require the user to grant authorization prior to sending the outgoing data containing the sensitive information.

In another illustrative embodiment, user authorization may be required prior to storing data containing the sensitive information on the data processing system. If authorization is granted, data containing the sensitive information may be stored on non-volatile memory, such as, but not limited to, the disk drive. If user authorization is not granted, any temporary storage, such as, but not limited to, temporary internet files, cache memory, and cookies, will be deleted immediately after the data is no longer being used or after a specified period of time.

Thus, the illustrative embodiments described herein provide a computer implemented method, apparatus, and computer program product protecting sensitive information on a data processing system. A determination is made as to whether a data processing system is publicly accessed. Responsive to determining that a data processing system is publicly accessed, the system identifies sensitive information. The data processing system monitors for the presence of sensitive information. Responsive to detecting the presence of the sensitive information, the system presents a warning to a user of the data processing system.

Figure 5:
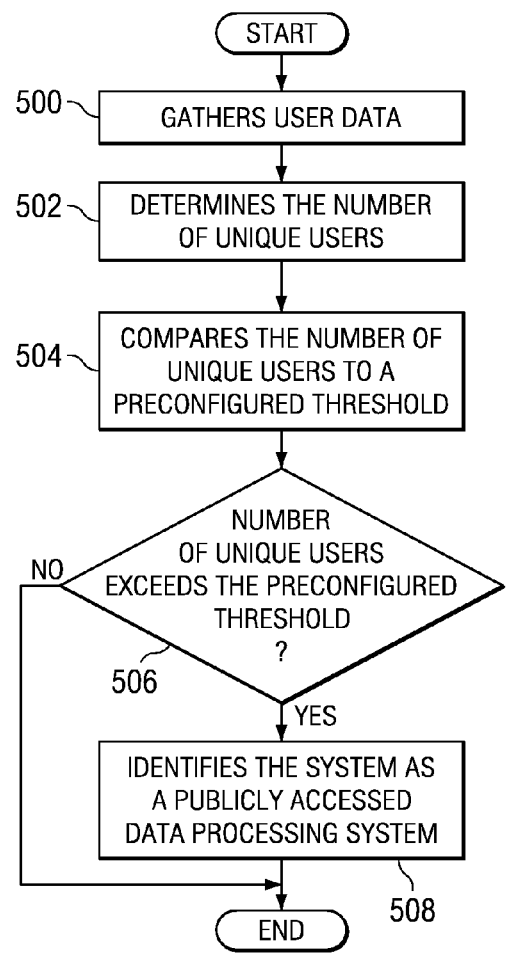
FIG. 5 is a flowchart illustrating a process for self-determining that a system is publicly accessed in accordance with an illustrative embodiment.

With reference now to FIG. 5, a flowchart illustrating a process for self-determining that a system is publicly accessed is presented in accordance with an illustrative embodiment. The process in FIG. 5 may be implemented in a software component, such as, public status component 310 depicted in FIG. 3.

The process begins by gathering user data (step 500). As described in the related case, the user data may consist of, but is not limited to, hard data generated from specific information the user passes on to the system, soft data created by analyzing users' behavioral usage patterns while interacting with the system, and mined data developed by mining the content that users enter into a browser of the system.

The process determines the number of unique users using the data gathered in step 500 (step 502). The number of unique users is determined by identifying the number of unique user profiles associated with the gathered data. A user profile is identified to be unique based upon statistical methods described in the related application.

The process compares the number of unique users to a preconfigured threshold (step 504). The process determines if the number of unique users exceeds the preconfigured threshold (step 506). If the process determines that number of unique users does not exceed the preconfigured threshold, the process ends. If the process determines that number of unique users does exceed the preconfigured threshold, the process identifies the system as a publicly accessed data processing system (step 508), with the process terminating thereafter.

Thus, the illustrative embodiments described herein provide an improved computer implemented method, apparatus, and computer program product protecting sensitive information on a data processing system. The illustrative embodiments provide warnings to users of a publicly accessed data processing system that sensitive information may be present on the data processing system. For example, a warning is presented if sensitive information is detected in data stored in a software application, such as, but not limited to, a word processing application or an internet browser.

Additionally, the illustrative embodiments present warnings to users of a publicly accessed data processing system that sensitive information may be contained in data packets of an outbound or an inbound transmission. In addition to the warning presented to the user, a user authorization may be required for the transmission of the data packets containing the sensitive information.

Furthermore, the illustrative embodiments protect sensitive information without requiring a user of a publicly accessed data processing system to perform any additional function, such as, but not limited to, configuring the security and privacy settings of a browser. Thus, the illustrative embodiments provide a non-intrusive method for protecting sensitive information without requiring the user to have any additional technical knowledge relating to computer security.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for protecting sensitive information on a data processing system, the method comprising the steps of:
    a computer determining whether the data processing system is a publicly accessed data processing system, wherein the step of the computer determining whether the data processing system is a publicly accessed data processing system comprises:
        the computer dynamically determining a number of unique users using the data processing system;
        the computer comparing the number of unique users to a preconfigured threshold; and
        the computer identifying the data processing system as a publicly accessed data processing system responsive to determining that the number of the unique users exceeds the preconfigured threshold;
    the computer identifying sensitive information responsive to determining that the data processing system is a publicly accessed data processing system, wherein the step of the computer identifying the sensitive information comprises the computer identifying the sensitive information using criteria selected from a set of criteria;
    the computer monitoring the data processing system for a presence of the sensitive information; and
    the computer presenting a warning to a user of the data processing system in response to detecting the presence of the sensitive information.

2. The method of claim 1, wherein the step of the computer monitoring the data processing system for a presence of the sensitive information comprises:
    the computer monitoring for the presence of the sensitive information in outbound data packets;
    the computer monitoring for the presence of the sensitive information in inbound data packets; and the computer monitoring for the presence of the sensitive information inputted into a software application running on the data processing system.

3. The method of claim 1, wherein the step of the computer determining whether the data processing system is a publicly accessed data processing system comprises:
the computer receiving an indication from the user that the data processing system is a publicly accessed data processing system.

4. The method of claim 1, wherein the sensitive information comprises at least one of phone numbers, addresses, credit card numbers, social security numbers, or driver license numbers.

5. The method of claim 4, wherein the sensitive information further comprises at least one of user defined data or administrator defined data.

6. The method of claim 1 further comprising:
the computer requesting a user authorization prior to transmitting data packets containing the sensitive information.

7. The method of claim 1 further comprising:
the computer requesting a user authorization prior to storing data containing the sensitive information on the data processing system.

8. A computer program product on one or more computer readable tangible storage devices for protecting sensitive information on a data processing system, the computer program product comprising:
program instructions, stored on at least one of the one or more computer readable tangible storage devices, to determine whether the data processing system is a publicly accessed data processing system, wherein the program instructions to determine whether the data processing system is a publicly accessed data processing system comprise:
dynamically determine a number of unique users using the data processing system;
compare the number of unique users to a preconfigured threshold; and
identify the data processing system as a publicly accessed data processing system in response to determining that the number of the unique users exceeds the preconfigured threshold;
program instructions, stored on at least one of the one or more computer readable tangible storage devices, to identify sensitive information in response to determining that the data processing system is publicly accessed data processing system, wherein the program instructions to identify the sensitive information use criteria selected from a set of criteria;
program instructions, stored on at least one of the one or more computer readable tangible storage devices, to monitor the data processing system for a presence of the sensitive information; and
program instructions, stored on at least one of the one or more computer readable tangible storage devices, to present a warning to a user of the data processing system in response to detecting the presence of the sensitive information.

9. The computer program product of claim 8, wherein the program instructions to monitor the data processing system for a presence of the sensitive information:
monitor for the presence of the sensitive information in outbound data packets;
monitor for the presence of the sensitive information in inbound data packets; and
monitor for the presence of the sensitive information inputted into a software application running on the data processing system.

10. The computer program product of claim 8, wherein the program instructions to determine whether the data processing system is a publicly accessed data processing system receive an indication from the user that the data processing system is a publicly accessed data processing system.

11. The computer program product of claim 8, wherein the sensitive information comprises at least one of phone numbers, addresses, credit card numbers, social security numbers, or driver license numbers.

12. The computer program product of claim 11, wherein the sensitive information further comprises at least one of user defined data or administrator defined data.

13. The computer program product of claim 8 further comprising: program instructions, stored on at least one of the one or more computer readable tangible storage devices, to request a user authorization prior to transmitting data packets containing sensitive information.

14. The computer program product of claim 8 further comprising: program instructions, stored on at least one of the one or more computer readable tangible storage devices, to request a user authorization prior to storing data containing sensitive information on the data processing system.

15. A computer system comprising:
one or more computer readable tangible storage devices, one or more processors, and one or more computer readable memories;
program instructions, stored on at least one of the one or more computer readable tangible storage devices for execution by at least one of the one or more processors via at least one of the one or more computer readable memories, to determine whether a data processing system is a publicly accessed data processing system, wherein the program instructions to determine whether the data processing system is a publicly accessed data processing system;
dynamically determine a number of unique users using the data processing system;
compare the number of unique users to a preconfigured threshold; and
identify the data processing system as a publicly accessed data processing system in response to determining that the number of the unique users exceeds the preconfigured threshold;
program instructions, stored on at least one of the one or more computer readable tangible storage devices for execution by at least one of the one or more processors via at least one of the one or more computer readable memories, to identify sensitive information in response to determining that the data processing system is a publicly accessed data processing system, wherein the program instructions to identify the sensitive information use criteria selected from a set of criteria;
program instructions, stored on at least one of the one or more computer readable tangible storage devices for execution by at least one of the one or more processors via at least one of the one or more computer readable memories, to monitor the data processing system for a presence of sensitive information; and
program instructions, stored on at least one of the one or more computer readable tangible storage devices for execution by at least one of the one or more processors via at least one of the one or more computer readable memories, to present a warning to a user of the data processing system in response to detecting the presence of the sensitive information.

16. The computer system of claim 15 further comprising program instructions, stored on at least one of the one or more computer readable tangible storage devices for execution by at least one of the one or more processors via at least one of the one or more computer readable memories, to request a user authorization prior to transmitting data packets containing the sensitive information.

17. The computer system of claim 15 further comprising program instructions, stored on at least one of the one or more computer readable tangible storage devices for execution by at least one of the one or more processors via at least one of the one or more computer readable memories, to request a user authorization prior to storing data containing the sensitive information on the data processing system.

* * * * *